United States Patent

[11] 3,628,383

| [72] | Inventors | William A. Tikanen<br>Reseda;<br>John H. Hering, Palos Verdes, both of Calif. |
|---|---|---|
| [21] | Appl. No. | 803,264 |
| [22] | Filed | Feb. 28, 1969 |
| [45] | Patented | Dec. 21, 1971 |
| [73] | Assignee | Genisco Technology Corporation<br>Compton, Calif. |

[54] ACCELEROMETER
16 Claims, 17 Drawing Figs.

[52] U.S. Cl..................................................... 73/516, 267/162
[51] Int. Cl..................................................... G01p 15/08
[50] Field of Search........................................ 73/514–517, 71.2; 340/17; 267/160–162, 158

[56] References Cited
UNITED STATES PATENTS

| 2,316,616 | 4/1943 | Powell | 73/71.2 X |
| 2,788,511 | 4/1957 | Marshall | 340/17 |
| 2,959,459 | 11/1960 | Ryan | 73/516 X |
| 3,295,808 | 1/1967 | Webb | 73/514 X |
| 3,451,040 | 6/1969 | Johnson | 340/17 |

Primary Examiner—James J. Gill
Attorney—Fraser and Bogucki

ABSTRACT: A compact, air-damped accelerometer useful for aerospace applications is disclosed having a seismic mass limited to rectilinear motion along a predetermined sensing axis by symmetrical cantilever spring suspensions coupled to each end of the mass. Each cantilever suspension includes a pair of springs each having connected inner and outer ring portions. During imposition of accelerations transverse to the sensing axis, the inner portion of one spring and the outer portion of the other spring are subjected to compressive loads that are equal and opposite and therefore cancel so that no deflection error is introduced. The remaining ring portions of the springs are subjected to equal and opposite tensile loads the effects of which therefore also cancel.

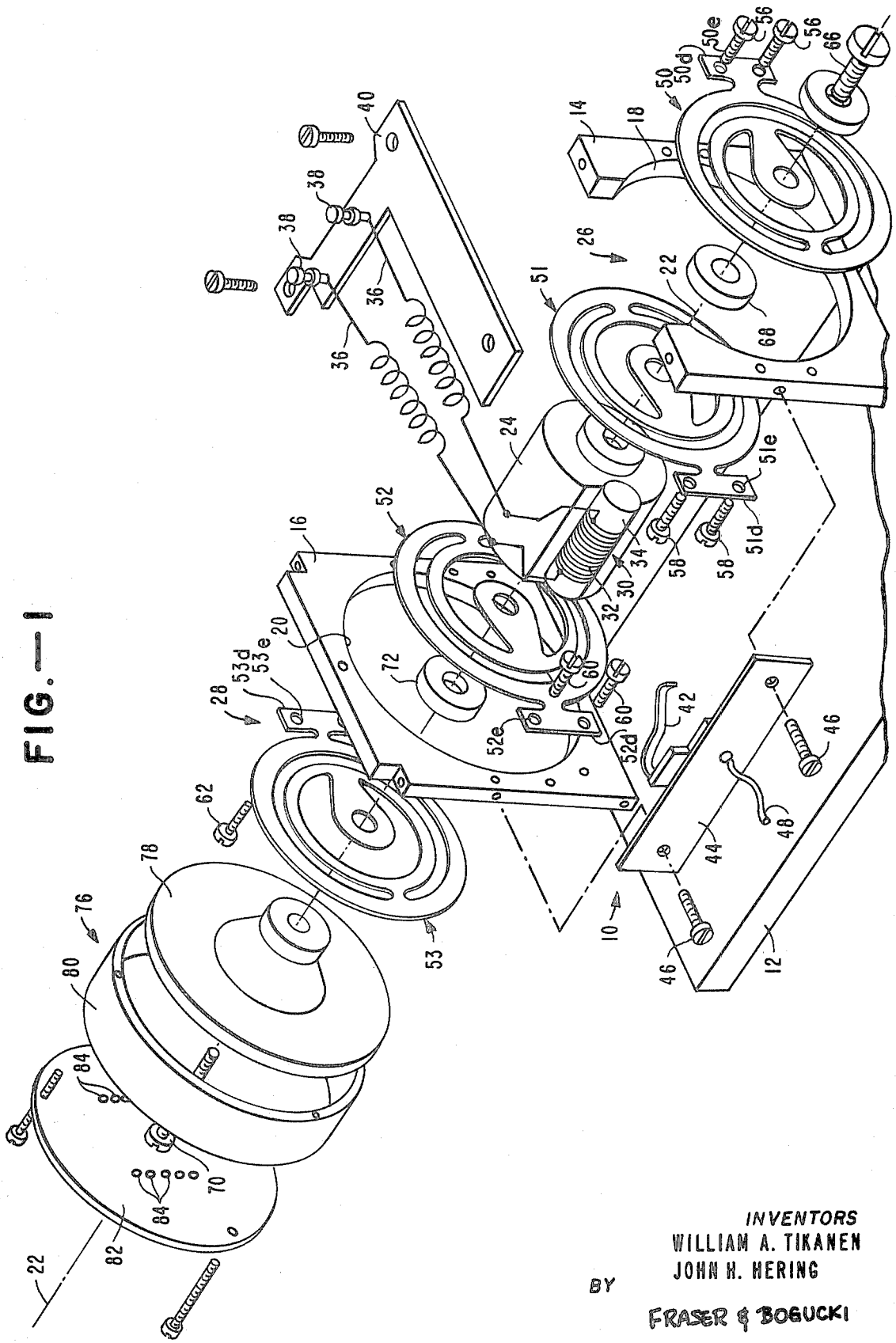

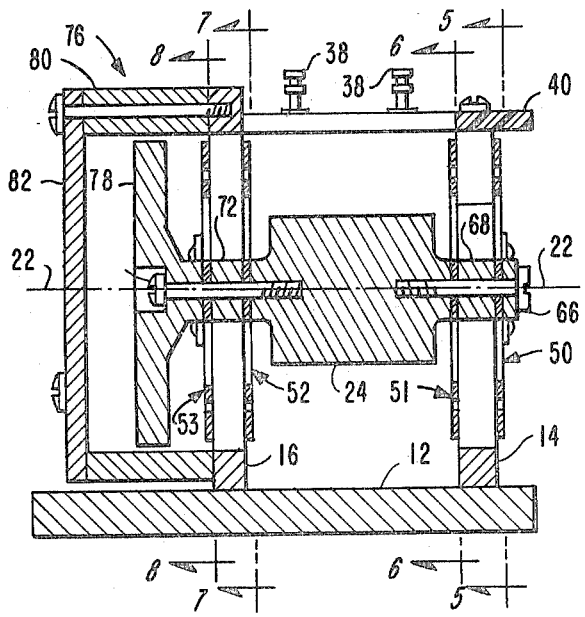
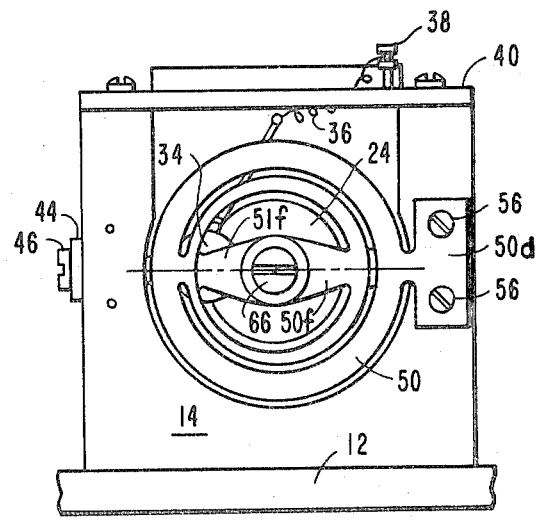
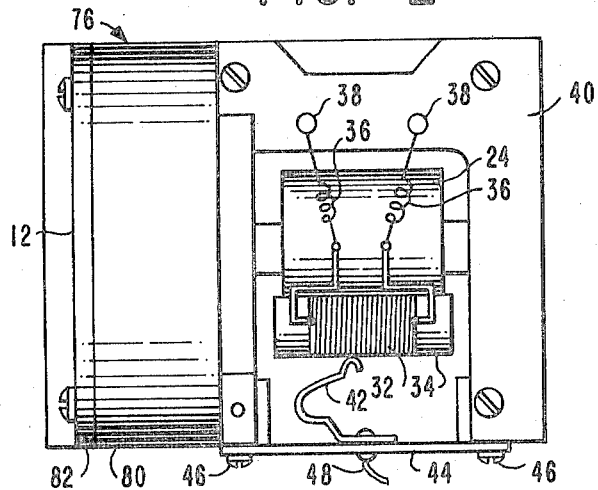
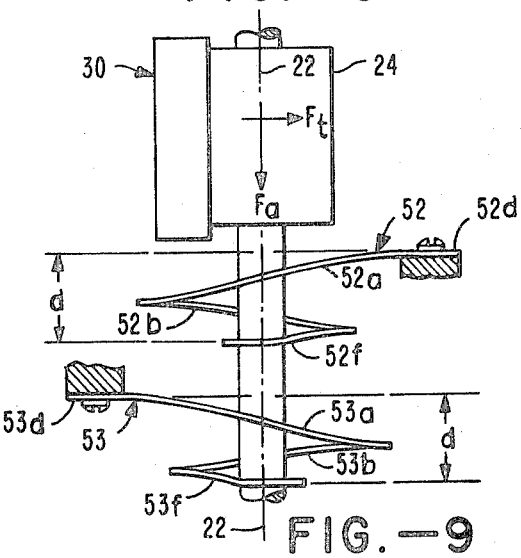
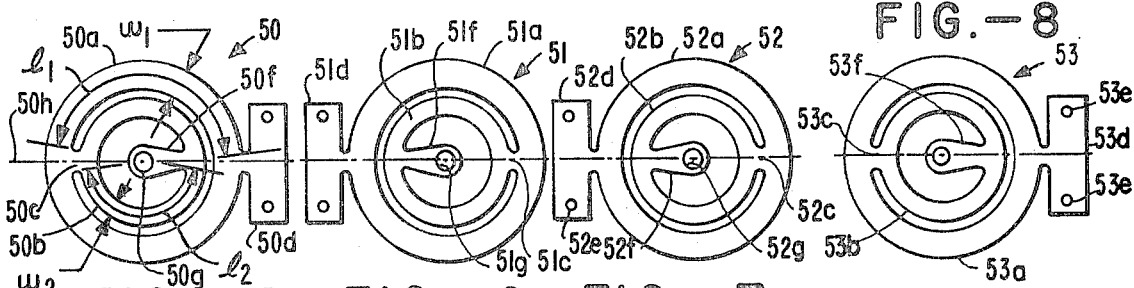
INVENTORS
WILLIAM A. TIKANEN
JOHN H. HERING
BY FRASER & BOGUCKI
ATTORNEYS

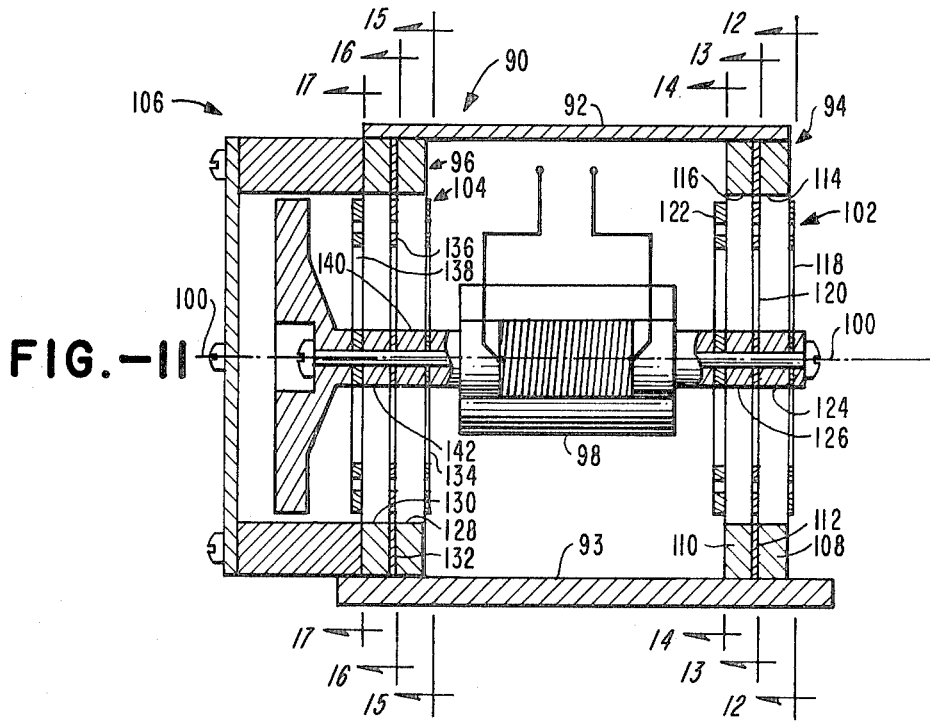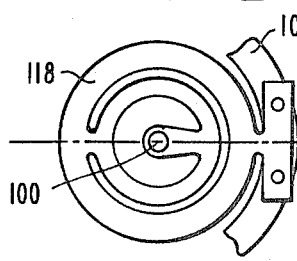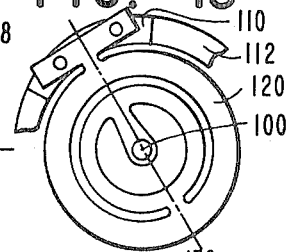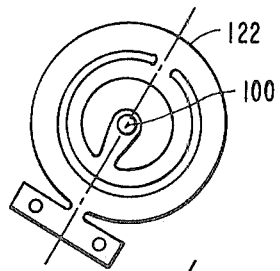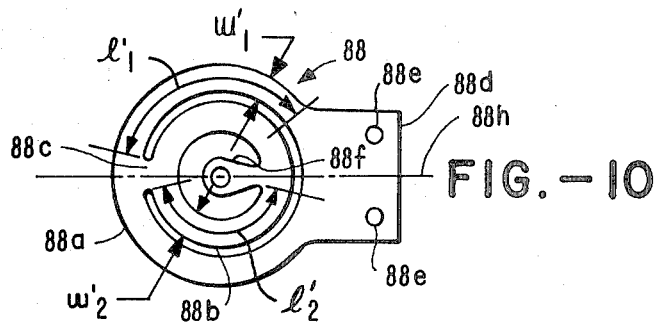
INVENTORS
WILLIAM A. TIKANEN
JOHN H. HERING
BY
FRASER & BOGUCKI
ATTORNEYS

ACCELEROMETER

BACKGROUND OF THE INVENTION

1. Field of the Invention

This invention relates generally to accelerometers and particularly to air-damped spring suspensions for supporting translational seismic masses in low-frequency responsive, single-axis accelerometers.

2. Description of the Prior Art

The measurement of low-frequency, low-level accelerations, such as those resulting from the maneuvering of an aircraft or other aerospace vehicle, is often made with single-axis, translational seismic mass accelerometers aligned with the longitudinal, lateral and vertical axes of the vehicle. The linear displacement of the mass in each accelerometer, which displacement is a measure of acceleration, is typically sensed by an electrical device such as a linear potentiometer or differential transformer. The electrical output of the device is directly proportional to acceleration however, only when the input acceleration frequency is below the natural frequency.

As the input acceleration frequency is increased beyond the natural frequency, the output decreases and becomes a direct measure of the input displacement. In aerospace vehicles, this characteristic is desirable, because the accelerometer can then measure low-frequency maneuvering accelerations while not responding to higher accelerations such as those associated with airframe and engine vibrations, for example.

In an accelerometer having a low natural frequency however, the displacement of the seismic mass is inherently relatively large. For example, an accelerometer with a range of ±2g and a natural frequency of 10 Hz. requires a relative displacement of about ±0.2 inch. Displacements of this magnitude impose certain requirements on the spring suspension system supporting the seismic mass.

Thus, besides the usual requirement that the spring suspension have a linear force displacement characteristic, the seismic mass should be constrained to move in a rectilinear path through its entire operable range of travel for accurate, single-degree response to forces along the sensing axis. Further, where a linear displacement sensing device such as a differential transformer or rectilinear potentiometer couples the seismic mass and the frame of the accelerometer, curvilinear motion of the mass cannot be tolerated as this often introduces an error into the output signal. Furthermore, curvilinear motion of the mass with respect to the frame will limit the type of damping arrangement which may be used.

For example, it is very desirable to employ pneumatic piston/cylinder damping means in low-frequency accelerometers in which either the piston or cylinder is connected directly to the seismic mass. Pneumatic damping not only provides desirable damping characteristics and minimizes the weight of the accelerometer but eliminates the need for special damping fluids which may leak and which tend to be more temperature sensitive than air. But because of the high tolerances required between the piston and cylinder to provide the proper air leakage rate about the piston, the motion of the piston must be precisely rectilinear to avoid contact with the cylinder. Contact between these elements results in the introduction of mechanical friction that seriously affects the accuracy of the instrument and makes its operation unpredictable. Accelerometers have been made in which the seismic mass is constrained to rectilinear travel by mechanical guides but these obviously introduce friction for which compensation cannot readily be made especially if the accelerometer is subject to acceleration components transverse to the sensing axis.

Another important requirement which must be met by the suspension of the single-axis accelerometer is that the instrument must respond solely to longitudinal acceleration components; thus, response to transverse components which will be reflected in the accelerometer output must be minimized. Such "crosstalk" resulting from transverse components is especially a problem where the seismic mass suspension is designed to permit large displacements of the mass.

The prior art includes accelerometers in which the seismic mass is supported at each end by a simple cantilever spring. These suspension systems are deficient however because upon deflection the mass moves in a curvilinear path about the point at which the spring is anchored. Moreover, once the mass is displaced from its zero deflection position, forces transverse to the sensing axis which place the spring under a compressive column load cause additional deflection which produces an error in the instrument output; transverse forces loading the spring in tension tend to decrease the spring deflection which is also seen as an error in the output. Although the errors due to compression and tension are not identical because of differences in stress distribution along the spring, under small transverse forces they are substantially equal. This characteristic led to the use of the folded cantilever or E-spring in place of the simple single leaf cantilever spring. The E-spring is effective in reducing errors caused by small transverse accelerations. The ends of the outer legs of the E-spring are attached to the instrument and the end of the center leg is coupled to one end of the mass. Under transverse loads, the pair of outer legs and center leg are oppositely stressed so that deflection errors tend to cancel. The use of the E-spring however, must be limited to applications in which relatively low transverse loads are imposed; as the transverse load increases, the compressive load becomes the major error-producing factor, and can eventually cause buckling of the spring.

SUMMARY OF THE INVENTION

According to the broad aspects of the present invention, an accelerometer is provided that includes a frame for attachment to a body whose acceleration is to be measured along a given axis, a seismic mass and a suspension coupling the frame and mass, the suspension being self-compensating for the effects produced by relatively large transverse accelerations. A suitable pickoff is used to provide an indication of the seismic mass displacement which is proportional to the acceleration along the sensing axis.

The suspension includes a plurality of individual, cantilever-type springs at each end of the seismic mass, each spring including first and second portions. When the accelerometer is subjected to transverse acceleration loads while the springs are simultaneously subjected to a deflecting translational acceleration; one of the portions of each spring will be under compression while the other portion will be subjected to tension. The springs at each end of the seismic mass are disposed symmetrically about the sensing axis so that the sum of the compression forces is zero and the sum of the tension forces is zero. As a result, the displacement of the mass is solely a function of the accelerational forces along the sensing axis and is virtually unaffected by loads transverse to that axis.

In accordance with another aspect of the invention, air-damping means in the form of a piston and cylinder arrangement is connected between the frame and the seismic mass, controlled leakage around the piston determining the level of damping.

In one of its specific, exemplary forms, the seismic mass of the accelerometer is attached to the frame for rectilinear translation by a pair of identical cantilever springs at each end of the mass. Each spring is fabricated from a single piece of appropriate spring sheet material and has a circular configuration including an inner ring portion and an outer ring portion both of which are concentric of the sensing axis. The spring is installed flat, that is, in the undeflected or unstressed configuration, the plane of the spring being oriented perpendicular to the sensing axis. This installation virtually eliminates any snapthrough center and hence any nonlinearity in the output during translation of the seismic mass through the zero deflection point.

Each spring includes an outer mounting strip extending from the outer ring for attachment to the frame and an inner mounting strip extending inwardly from the inner ring symmetrically with the outer mounting strip for connection to the seismic mass. Each spring also includes a bridge portion coupling the inner and outer rings at points in alignment with the inner and outer mounting strips.

Since the compressive loads on the springs due to transverse accelerations are the major error-producing factors, each spring is made so that the deflection error which would be caused by compressive loads on the outer ring is equal to the deflection error which would be caused by compressive loads on the inner ring. To accomplish this, the spring rates of the inner and outer rings along the sensing axis must be equal and the critical buckling load of the active portions of the outer ring must be equal to the critical buckling load of the active portions of the inner ring. In this connection, according to one form of the spring, the widths of the active portions of the inner and outer rings are made equal; in another form of the spring, in which the available deflection is sought to be maximized, the active portions of the rings are made as long as possible, the ratio of the width of the outer ring to the width of the inner ring being established by well-known beam deflection equations. The foregoing feature assures linear motion of the seismic mass whose displacement relative to the frame is a precise function of the acceleration along the sensing axis.

The springs on each end of the mass are axially spaced to allow free movement of each spring during displacement of the mass and are oriented 180° out of phase so that the outer mounting strips are diametrically opposed and therefore symmetrical about the sensing axis.

A piston is attached to the seismic mass coaxially therewith and is received by a cylinder mounted on one end of the frame. A small clearance is provided about the piston to allow a controlled, predetermined amount of leakage to provide the desired damping characteristics.

According to one modified embodiment of the present invention, three springs with their mounting strips symmetrically oriented about the sensing axis 120° apart may be utilized at each end of the mass. This alternative is useful where a somewhat higher spring rate may be tolerated and is advantageous because it assures that linear motion solely along the sensing axis will be maintained despite subjection of the accelerometer to large transverse loads.

Moreover, according to another modified form of the invention, the springs at each end of the seismic mass may be of different thicknesses to suppress vibration-induced resonance of individual springs.

BRIEF DESCRIPTION OF THE DRAWINGS

Other objects and advantages of the present invention will become apparent from a reading of the detailed description below in conjunction with the drawings in which:

FIG. 1 is a perspective, exploded view of an accelerometer according to one form of the invention in which the seismic mass is supported at each end by a pair of cantilever-type springs;

FIG. 2 is a side elevation view, in section, of the accelerometer of FIG. 1;

FIG. 3 is an end elevation view of the accelerometer of FIG. 1;

FIG. 4 is a top plan view of the accelerometer of FIG. 1;

FIG. 5 is a fragmentary transverse section of the accelerometer of FIG. 1 along the plane 5—5 in FIG. 2;

FIG. 6 is a fragmentary transverse section of the accelerometer of FIG. 1 along the plane 6—6 in FIG. 2;

FIG. 7 is a fragmentary transverse section of the accelerometer of FIG. 1 along the plane 7—7 in FIG. 2;

FIG. 8 is a fragmentary transverse section of the accelerometer of FIG. 1 along the plane 8—8 in FIG. 2;

FIG. 9 is a somewhat schematic, top plan view, partially in section, of a portion of the accelerometer of FIG. 1 to illustrate the operation of the spring suspension system during simultaneous axial translation of the seismic mass and imposition of a transverse load;

FIG. 10 is a front view of an alternative embodiment of a cantilever-type spring which may be utilized in the accelerometer suspension system;

FIG. 11 is a side elevation view, in section, of an alternative embodiment of the accelerometer of the present invention in which the seismic mass is supported at each end by three cantilever springs;

FIG. 12 is a fragmentary transverse section view of the accelerometer of FIG. 10 taken along the plane 12—12;

FIG. 13 is a fragmentary transverse section view of the accelerometer of FIG. 10 taken along the plane 13—13;

FIG. 14 is a fragmentary transverse section view of the accelerometer of FIG. 10 taken along the plane 14—14;

FIG. 15 is a fragmentary transverse section view of the accelerometer of FIG. 10 taken along the plane 15—15;

FIG. 16 is a fragmentary transverse section view of the accelerometer of FIG. 10 taken along the plane 16—16; and FIG. 17 is a fragmentary transverse section of the accelerometer of FIG. 10 taken along the plane 17—17.

DETAILED DESCRIPTION

Referring to FIGS. 1–8, there is shown an accelerometer representing a first embodiment of the present invention. The accelerometer comprises a frame 10 that includes a base 12 to which are attached upright, spaced, parallel front and rear support plates 14 and 16, respectively. The plates 14 and 16 are provided with circular openings 18 and 20 that have the same diameter and are in coaxial alignment along a longitudinal axis 22 which forms the sensing axis of the instrument. The plates 14 and 16 support between them, for translation along the sensing axis 22, a seismic mass 24 coupled to the frame 10 by front and rear spring suspensions 26 and 28, respectively. Each suspension 26, 28 is symmetrically disposed about the sensing axis 22 as viewed along that axis.

In the example shown, the seismic mass 24 comprises a generally cylindrical body whose central axis is coincident with the sensing axis 22. A suitable pickoff means is provided to sense the longitudinal displacement of the mass 24 along the axis 22 relative to the frame 10 in either direction from the zero deflection point. In the example under discussion the pickoff comprises a precision linear potentiometer 30 having a wire resistance element 32 wound on an insulated, cylindrical core 34 attached to one side of the mass 24 and oriented parallel with the sensing axis 22. The resistance element 32 is coupled to an electrical circuit (not shown) via a pair of conductors 36 coupling the ends of the element 32 and a pair of terminals 38 mounted on a terminal board 40 affixed to the upper edges of the plates 14 and 16. The potentiometer wiper 42 is mounted on an insulating strip 44 attached to the side edges of the plates 14 and 16 by screws 46 and is adapted for connection to the external electrical circuit by a conductor 48. It will be apparent to those skilled in the art that other types of transducers, including differential transformers or switch contacts, for example, may be utilized to pick off the displacement of the mass and it is to be understood that the invention is not limited to any specific kind of pickoff device.

The suspensions 26 and 28 consist of identical, circular, cantilever-type springs 50, 51, 52 and 53, springs 50 and 51 forming the front suspension 26 and the springs 52 and 53 making up the rear suspension 28. Each spring may be fabricated by photoetching a single piece of flat sheet metal stock of NiSpan C, Berylco 25 or the like having a a uniform thickness falling within the range of about 0.005 inch to about 0.017 inch. Because all of the springs 50–53 are identical, only spring 50 will be described in detail, the various portions of the spring 50 being identified by the letters *a*, *b*, *c*, etc., and corresponding portions of the other springs being identified by the same letter designations.

The spring 50 has two principal portions—an outer ring 50*a* having an outside diameter slightly smaller than the opening 18 in the plate 14 and an inner ring 50*b* narrower than the outer ring 50*a* and concentric therewith. The rings 50*a* and 50b are joined by a narrow bridging portion 50c. An outer mounting strip 50d with vertically spaced holes 50e projects from the outer ring 50a for attaching the spring to the support plate 14. A central mounting strip 50f having a hole 50g concentric with the outer and inner rings 50a and 50b extends inwardly from the inner ring 50b for coupling the spring to the seismic mass 24. The bridging portion 50c, outer mounting strip 50d, central mounting strip 50f and the hole 50g are all symmetrically disposed about a diameter 50h.

The springs 50 and 51 are installed by fastening the outer mounting strips 50d and 51d to the front and rear faces of the plate 14 with screws 56 and 58. The springs are mounted concentric with the opening 18 and are positioned so that the diameters 50h and 51h lie in a horizontal plane that is parallel to the base 12 and passes through the sensing axis 22. It will be noted that the outer mounting strips of the springs 50 and 51 are diametrically opposed with the strip 50d on the right-hand side and the strip 51d on the left-hand side of the axis 22 as best seen in FIGS. 1, 5 and 6. The rear suspension springs 52 and 53 are similarly installed on the rear plate 16 with screws 60 and 62 with the strips 52d and 53d facing toward the left and right, respectively, as depicted in FIGS. 1, 7 and 8.

The front springs 50 and 51 are attached to the mass 24 by an axially oriented screw 66 inserted through the holes 50g and 51g. A spacer ring 68, having a thickness equal to that of the plate 14 is inserted between the springs 50 and 51 to maintain separation between them for free movement of each spring during axial displacement of the mass 24. The rear springs 52 and 53 are similarly connected to the mass 24 with an axial screw 70 and separated by a spacer ring 72 having the same thickness as the rear plate 16.

Each spring 50–53 is installed flat and undeflected with the plane of the spring perpendicular to the sensing axis 22. As a result of initially mounting the springs in the flat, unstressed condition, no snapthrough center occurs when the mass passes through the zero deflection point and no discontinuities are therefore introduced into the output of the instrument.

Referring now in particular to FIGS. 1 and 2, the instrument includes an air-damping device 76 that comprises a piston 78 coaxial of the axis 22 and connected to the rear of the seismic mass by the screw 70. The piston 78 is received within a cylinder 80 affixed to the rear plate 16. The piston is dimensioned for a small peripheral clearance which may typically be of the order of 0.002 inch. A circular plate 82, provided with a series of small apertures 84 to permit air to enter and escape from the cylinder 80 at a controlled rate, covers the rear extremity of the cylinder 80.

With the aid of FIG. 9, which is a schematic representation of the rear suspension 28 in the deflected condition, the operation of the accelerometer of FIGS. 1–8 will now be described, it being understood that the front suspension 26 functions in the same fashion. When an acceleration is applied to the instrument along the sensing axis 22, the seismic mass 24 is displaced relative to the frame 10 to a point of dynamic equilibrium. This may be more conveniently viewed as the application of an axial displacing force $F_a$ to the mass along the axis 22 which causes a deflection $d$ of the springs. The displacement of the mass 24 and hence the output of the potentiometer 30 will be directly proportional to the input acceleration if the acceleration frequency is at least 1 octave below the mechanical resonance frequency of the spring mass system.

In the deflected state of the springs, as exemplified by the springs 52 and 53 in FIG. 9, the planes of the outer and inner rings of each spring assume opposed S-shaped curves. During the presence of $F_a$, if a transverse force $F_t$ is applied to the mass 24 perpendicular to $F_a$ and parallel with the base 12, the outer ring 52a and the inner ring 53b are placed under compression and the inner ring 52b and the outer ring 53a are subjected to tension.

As stated earlier, the major error-producing factors are the compressive loads caused by $F_t$. In order for these errors caused by the loads to cancel, both the spring rates along the sensing axis and the critical buckling loads must be equal for the active portions of the outer and the inner rings. Referring to FIG. 5 once more by way of example, for simplified analysis each ring 50a and 50b may be considered as having two active portions each having a mean circular arc length $l_1$ and $l_2$, respectively. Applying well-known deflection equations for beams having rectangular cross sections and subjected to axial buckling loads, it may be shown that the spring rates will be equal for active portions of the same thickness and material if:

$$w_1/w_2 = (l_1/l_2)^3 \qquad (1)$$

where $w_1$ is the width of the outer ring and $w_2$ is the width of the inner ring.

Moreover, the critical buckling loads will be equal if $$w_1/w_2 = (l_1/l_2)^2 \qquad (2)$$

The foregoing equations (1) and (2) show that the desired conditions of equal spring rates and equal critical buckling loads can only be met if the lengths $l_1$ and widths $w_1$ of the active portions of the outer ring are equal to the lengths $l_2$ and widths $w_2$ of the active portions of the inner ring. A spring 88 complying with these conditions is shown in FIG. 10. In this embodiment, each active portion of the outer ring 88a has a mean circular arc length $l'_1$ equal to the mean circular arc length $l'_2$ of each active portion of the inner ring 88b; likewise, the width $w'_1$ of the outer ring 88a is equal to the width $w'_2$ of the inner ring 88b.

Since it is often desirable to maximize the available deflection, the active portions of the springs are made as long as possible as in the embodiment represented by FIG. 5. In this case, equation (2) above is utilized to determine the width ratio $w_1/w_2$ and it will be seen that when the active portions of the outer ring are longer than the active portions of the inner ring, the width $w_1$ will be greater than the width $w_2$. Although the longer outer ring active portions result in a lower relative spring rate for the outer ring, the bending stress in the inner ring is also lowered.

In the spring configuration described, both the outer and inner portions have substantially equal resistance to transverse loads, the tendency of one portion to introduce a deflection error being effectively canceled by the tendency of the other portion to introduce an opposing and equal deflection error. As a further result of the foregoing, as the springs deflect, the mass moves along a substantially straight line path.

The linear motion of the seismic mass provided by the suspension of this invention makes possible the use of more than two springs at each end of the mass. An accelerometer 90 with seismic mass suspensions including three springs having the same configuration as those described in connection with FIGS. 5–8 is shown in FIGS. 11–17. Springs having the configuration of FIG. 10 may, of course, be alternatively employed. The use of more than two springs increases the spring rate or stiffness of the suspension and of course the natural frequency, but the resistance to loads transverse of the sensing axis is correspondingly increased.

The accelerometer 90 of FIGS. 11–17 includes a frame comprising upper and lower horizontal plates 92 and 93, front and rear spaced, upright supports 94 and 96 mounted parallel to one another on the base 92, a seismic mass 98 adapted for translation along a longitudinal sensing axis 100, front and rear spring suspensions 102 and 104 coupling the mass 98 and the supports 94 and 96, respectively, and a pneumatic damping device 106 similar to the damper 76 already described.

The front support 94 comprises two plates 108 and 110 separated by a spacer 112 and having central circular openings 114 and 116, respectively, concentric of the sensing axis 100. A first suspension spring 118 is mounted on the forward face of plate 108, a second spring 120 is sandwiched between the plates 108 and 110 and a third spring 122 is mounted on the rear face of the plate 110. The spacer 112 has a thickness equal to that of the spring 120 and the openings 114 and 116 are of equal diameter which is slightly larger than the outer diameter of the springs to permit deflection without interference. Ring spacers 124 and 126, having the same thicknesses as plates 108 and 110, respectively, separate the springs.

A similar assembly is provided at the rear end of the mass 98, including plates 128 and 130, spacer 132, springs 134, 136 and 138, and ring spacers 140 and 142.

In the embodiment of the accelerometer shown in FIGS. 11–17, the spring thicknesses may all be identical; however, an aspect of the present invention involves the alternative use of springs having different thicknesses to suppress vibration-induced resonances of individual springs. Thus, as shown in FIG. 11, springs 118 and 134 are very thin, springs 120 and 136 are somewhat thicker and springs 122 and 138 are still thicker.

REferring to FIGS. 12–17, it will be seen that the springs of both front and rear suspensions are angularly displaced from one another by 120° so that each spring group is symmetrically disposed about the sensing axis 100. In this way, irrespective of the direction of the transverse acceleration forces, the error-producing loads imposed on the suspension system will cancel.

What is claimed is:

1. An accelerometer comprising:
   a frame;
   a seismic mass;
   a suspension coupling said mass and said frame and constraining said mass to movement relative to said frame along a single axis, said suspension including at each end of said mass a plurality of cantilever springs disposed symmetrically about said axis, said springs in the unstressed condition being flat and lying in planes substantially perpendicular to said axis, each spring having a first ring portion connected to said frame and a second ring portion connected to said mass, said ring portions being concentric about said axis and connected by a bridge, all of said portions of said springs having substantially the same critical buckling load whereby during translation of said mass along said axis, loads applied to said mass transverse of said axis place one of said portions of each spring under a compressive load, the net deflection errors caused by all of said compressive loads being substantially zero; and
   means coupling said mass and said frame for providing an output indicative of the axial displacement of said mass relative to said frame.

2. An accelerometer, as defined in claim 1, in which:
all of said springs are made of the same material and have the same thickness, the spring rates of said springs along said axis being substantially equal whereby the lengths of all of said spring portions are substantially equal and the widths of all of said spring portions are substantially equal.

3. An accelerometer, as defined in claim 1, in which:
all of the springs are made of the same material and have the same thickness, the lengths and widths of said first and second portions of each spring conforming substantially to the relationship
$$w_1/w_2 = (l_1/l_2)^2$$
in which $w_1$ is the width of the first portion, $l_1$ is the length of the first portion, $w_2$ is the width of the second portion and $l_2$ is the length of the second portion.

4. An accelerometer, as defined in claim 1, in which:
the thicknesses of the springs at each end of the mass are different whereby the vibration-induced resonance of individual springs is suppressed.

5. An accelerometer, as defined in claim 1, which includes:
means coupling said mass and said frame for pneumatically damping the movement of said mass.

6. An accelerometer comprising:
a frame;
a seismic mass;
a suspension at each end of said mass coupling said mass and said frame and constraining said mass to movement relative to said frame along a single axis, said suspension including a plurality of circular, cantilever-type springs disposed symmetrically about said axis, said springs in the unstressed condition being flat and lying in planes substantially perpendicular to said axis, each spring comprising an outer ring concentric of said axis, an inner ring concentric of said axis, a narrow bridge portion connecting said inner and outer portion, an outer mounting strip projecting outwardly from said outer ring for attachment to said frame, an inner mounting strip projecting inwardly from said inner ring for attachment to said mass, said bridge portion, outer mounting strip and inner mounting strip lying along a diameter of said spring and defining opposed, active portions of said outer and inner ring symmetrical of said diameter, the active portions of said outer ring having substantially the same critical buckling load as the active portions of said inner ring whereby during translation of said mass along said axis loads applied to said mass transverse of said axis place the active portions of one of said rings of each spring under compressive load and the active portions of the other of said rings of each spring under tensile load, the tendency of all of said active portions under compressive load to produce deflection errors which cancel and the tendency of all of said active portions under tensile load to produce deflection errors which cancel; and
means coupling said mass and frame for providing an output indicative of the amount of axial displacement of said mass relative to said frame.

7. An accelerometer, as defined in claim 6, in which:
said suspension comprises two springs, the outer mounting strip of one of said springs being diametrically opposed to the outer mounting strip of the other of said springs.

8. An accelerometer, as defined in claim 7, in which:
all of said springs are made of the same material and have the same thickness, the spring rates of said springs along said axis being substantially equal, the lengths of all of said active portions being substantially equal and the widths of all of said active portions being substantially equal.

9. An accelerometer, as defined in claim 7, in which:
all of said springs are made of the same material and have the same thickness, the lengths and widths of said active portions of said outer and inner rings of each spring conforming substantially to the relationship
$$w_1/w_2 = (l_1/l_2)^2$$
in which $w_1$ is the width of each active portion of said outer ring, $l_1$ is the length of each active portion of said outer ring, $w_2$ is the width of each active portion of said inner ring and $l_2$ is the length of each active portion of said inner ring.

10. An accelerometer, as defined in claim 7, in which:
the thicknesses of the springs at each end of the mass are different whereby the vibration-induced resonance of individual springs is suppressed.

11. An accelerometer, as defined in claim 7, which includes:
a piston attached to said mass concentric of said axis; and
a cylinder attached to said frame concentric of said axis, said piston being disposed within said cylinder and dimensioned for a small peripheral clearance to provide a controlled rate of air leakage about said piston, said cylinder being closed by a cover plate having apertures dimensioned to control the rate of ingress and egress of air from said cylinder during movement of said piston.

12. An accelerometer, as defined in claim 6, in which:
said suspension comprises three springs, the outer mounting strips of said springs being angularly spaced 120° from one another about said axis.

13. An accelerometer, as defined in claim 12, in which:
all of said springs are made of the same material and have the same thickness, the spring rates of said springs along said axis being substantially equal, the lengths of all of said active portions being substantially equal and the widths of all of said active portions being substantially equal.

14. An accelerometer, as defined in claim 12, in which:

all of said springs are made of the same material and have the same thickness, the lengths and widths of said active portions of said outer and inner rings of each spring conforming substantially to the relationship $$w_1/w_2 = (l_1/l_2)^2$$

in which $w_1$ is the width of each active portion of the outer ring, $l_1$ is the length of each active portion of the outer ring, $w_2$ is the width of each active portion of said inner ring and $l_2$ is the length of each active portion of said inner ring.

15. An accelerometer, as defined in claim 12, in which:
the thicknesses of the springs at each end of the mass are different whereby the vibration-induced resonance of individual springs is suppressed.

16. An accelerometer, as defined in claim 12, which includes:
a piston attached to said mass concentric of said axis; and
a cylinder attached to said frame concentric of said axis, said piston being disposed within said cylinder and dimensioned for a small peripheral clearance to provide a controlled rate of air leakage about said piston, said cylinder being closed by a cover plate having apertures dimensioned to control the rate of ingress and egress of air flow from said cylinder during movement of said piston.

* * * * *